US012551025B2

(12) United States Patent
Youngblood et al.

(10) Patent No.: US 12,551,025 B2
(45) **Date of Patent: *Feb. 17, 2026**

(54) MULTI-ZONE TEMPERATURE MODULATION SYSTEM FOR BED OR BLANKET

(71) Applicant: Sleep Solutions, Inc., Wilmington, DE (US)

(72) Inventors: Todd Youngblood, Mooresville, NC (US); Tara Youngblood, Mooresville, NC (US)

(73) Assignee: Sleep Solutions, Inc., Wilmingon, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/931,577

(22) Filed: Oct. 30, 2024

(65) Prior Publication Data

US 2025/0057324 A1 Feb. 20, 2025

Related U.S. Application Data

(63) Continuation of application No. 18/170,990, filed on Feb. 17, 2023, which is a continuation of application (Continued)

(51) Int. Cl.

| | |
|---|---|
| ***A47C 21/04*** | (2006.01) |
| ***A47G 9/02*** | (2006.01) |
| ***F25B 21/04*** | (2006.01) |

(52) U.S. Cl.

CPC ............ *A47C 21/04* (2013.01); *A47G 9/0215* (2013.01); *F25B 21/04* (2013.01); *A47C 21/042* (2013.01);

(Continued)

(58) Field of Classification Search

CPC .... A47G 9/0215; A47G 9/1036; A47C 21/04; A47C 21/042; A47C 21/044; A47C 21/046; A47C 21/048; A61G 2203/46; A61G 2210/70; A61G 2210/90; F25B 21/02; F25B 21/04; F24F 5/0042; A61M 2205/3673; A61M 2021/0066

(Continued)

(56) References Cited

U.S. PATENT DOCUMENTS

| | | | |
|---|---|---|---|
| 2,504,308 | A | 4/1950 | Donkle |
| 2,753,435 | A | 7/1956 | Ivar |

(Continued)

FOREIGN PATENT DOCUMENTS

| | | |
|---|---|---|
| GB | 2101966 | 1/1983 |

*Primary Examiner* — David R Hare

(74) *Attorney, Agent, or Firm* — Cozen O'Connor

(57) ABSTRACT

A temperature modulation system for a bed, blanket, or other furniture includes a fluid for moderating temperature change, a number of conduit circuits for directing the fluid through respective zones, a control unit including a thermoelectric device for modulating temperature of the fluid, and a pump. Each of the conduit circuits selectively and independently directs fluid through its respective zone in order to produce a temperature within the zone that is independent of the temperature outside the zone. The system also includes an arrangement of one or more zones in an arrangement in which the control unit is programmed to vary the zone.

9 Claims, 6 Drawing Sheets

Related U.S. Application Data

No. 17/736,657, filed on May 4, 2022, now Pat. No. 11,583,096, which is a continuation of application No. 17/500,498, filed on Oct. 13, 2021, now Pat. No. 11,324,330, which is a continuation of application No. 16/684,648, filed on Nov. 15, 2019, now Pat. No. 11,147,389, which is a continuation of application No. 15/961,134, filed on Apr. 24, 2018, now Pat. No. 10,477,978, which is a continuation of application No. 15/482,148, filed on Apr. 7, 2017, now Pat. No. 10,667,622, which is a continuation of application No. 12/203,241, filed on Sep. 3, 2008, now abandoned.

(60) Provisional application No. 61/084,995, filed on Jul. 30, 2008.

(52) U.S. Cl.
CPC .......... *A47C 21/044* (2013.01); *A47C 21/046* (2013.01); *A47C 21/048* (2013.01); *A61G 2203/46* (2013.01); *A61G 2210/70* (2013.01); *A61G 2210/90* (2013.01)

(58) Field of Classification Search
USPC .................................................. 5/421; 63/3.2
See application file for complete search history.

(56) References Cited

U.S. PATENT DOCUMENTS

| | | | | |
|---|---|---|---|---|
| 3,154,926 | A * | 11/1964 | Hirschhorn | F25B 21/04 165/172 |
| 3,648,469 | A * | 3/1972 | Chapman | H10N 10/00 5/636 |
| 3,867,939 | A | 2/1975 | Moore et al. | |
| 4,114,620 | A | 9/1978 | Moore et al. | |
| 4,132,262 | A | 1/1979 | Wibell | |
| 4,162,393 | A | 7/1979 | Balboni | |
| 4,175,297 | A | 11/1979 | Robbins et al. | |
| 4,659,905 | A | 4/1987 | Gabrosek et al. | |
| 4,777,802 | A | 10/1988 | Feher | |
| 4,982,466 | A | 1/1991 | Higgins et al. | |
| 4,996,970 | A * | 3/1991 | Legare | A45F 3/04 126/210 |
| 5,033,136 | A * | 7/1991 | Elkins | A47C 21/048 5/500 |
| 5,329,096 | A | 7/1994 | Suematsu | |
| 5,448,788 | A * | 9/1995 | Wu | A47C 21/048 5/421 |
| 5,500,007 | A | 3/1996 | Kim et al. | |
| 5,555,579 | A | 9/1996 | Wu | |
| 5,568,659 | A | 10/1996 | Fogel | |
| 5,577,278 | A | 11/1996 | Barker et al. | |
| 5,586,347 | A | 12/1996 | Frischknecht | |
| 5,594,962 | A | 1/1997 | Bogdanoff | |
| 5,669,094 | A | 9/1997 | Swanson | |
| 5,693,079 | A | 12/1997 | Van Duren | |
| 5,697,963 | A | 12/1997 | Augustine | |
| 5,701,621 | A | 12/1997 | Landi et al. | |
| 5,800,480 | A | 9/1998 | Augustine et al. | |
| 5,871,151 | A | 2/1999 | Fiedrich | |
| 5,948,303 | A | 9/1999 | Larson | |
| 6,006,524 | A | 12/1999 | Park | |
| 6,163,907 | A | 12/2000 | Larson | |
| 6,273,810 | B1 | 8/2001 | Rhodes, Jr. et al. | |
| 6,349,439 | B1 | 2/2002 | Cook et al. | |
| 6,539,725 | B2 | 4/2003 | Bell | |
| 6,557,353 | B1 * | 5/2003 | Fusco | F25B 21/02 62/3.5 |
| 6,581,224 | B2 | 6/2003 | Yoon | |
| 6,582,456 | B1 | 6/2003 | Hand et al. | |
| 6,606,754 | B1 | 8/2003 | Flick | |
| 6,768,086 | B2 | 7/2004 | Sullivan et al. | |
| 6,826,789 | B1 | 12/2004 | Choi | |
| 6,855,158 | B2 | 2/2005 | Stolpmann | |
| 6,859,967 | B2 | 3/2005 | Harrison et al. | |
| 6,871,365 | B2 | 3/2005 | Flick et al. | |
| 6,934,985 | B2 | 8/2005 | Sanders | |
| 6,945,987 | B2 | 9/2005 | Beard et al. | |
| 6,957,454 | B1 | 10/2005 | Newton | |
| 7,084,774 | B2 | 8/2006 | Martinez | |
| 7,111,465 | B2 | 9/2006 | Bell | |
| 7,165,281 | B2 | 1/2007 | Larssson et al. | |
| 7,176,419 | B2 | 2/2007 | Ellis et al. | |
| 7,226,471 | B2 | 6/2007 | Heaton et al. | |
| 7,331,184 | B2 * | 2/2008 | Lee | F25B 21/04 62/3.5 |
| 7,353,554 | B2 | 4/2008 | Wang | |
| 7,877,827 | B2 | 2/2011 | Marquette et al. | |
| 8,324,533 | B2 | 12/2012 | Lee | |
| 8,732,874 | B2 | 5/2014 | Brykalski et al. | |
| 10,477,978 | B1 * | 11/2019 | Youngblood | A47C 21/04 |
| 10,667,622 | B1 * | 6/2020 | Youngblood | A47C 7/744 |
| 10,813,468 | B1 * | 10/2020 | Youngblood | A47G 9/0215 |
| 10,986,934 | B1 * | 4/2021 | Youngblood | A47C 21/04 |
| 11,147,389 | B1 * | 10/2021 | Youngblood | F25B 21/04 |
| 11,324,330 | B1 * | 5/2022 | Youngblood | A47G 9/0215 |
| 11,583,096 | B1 * | 2/2023 | Youngblood | A47C 7/748 |
| 2002/0124312 | A1 | 9/2002 | Yoon | |
| 2003/0046762 | A1 | 3/2003 | Stolpmann et al. | |
| 2003/0061664 | A1 | 4/2003 | Salvatini et al. | |
| 2003/0135929 | A1 | 7/2003 | Dennison et al. | |
| 2003/0159219 | A1 | 8/2003 | Harrison et al. | |
| 2003/0208848 | A1 | 11/2003 | Flick et al. | |
| 2003/0234247 | A1 | 12/2003 | Stern | |
| 2004/0187216 | A1 | 9/2004 | Lin | |
| 2005/0278863 | A1 | 12/2005 | Bahash et al. | |
| 2006/0013703 | A1 | 1/2006 | Yokozawa et al. | |
| 2006/0048520 | A1 | 3/2006 | Huang et al. | |
| 2006/0053558 | A1 | 3/2006 | Ye | |
| 2007/0277313 | A1 | 12/2007 | Terech | |
| 2008/0085200 | A1 | 4/2008 | Michels et al. | |
| 2008/0127423 | A1 | 6/2008 | Gammons | |
| 2008/0141708 | A1 | 6/2008 | Obosu et al. | |
| 2010/0132124 | A1 | 6/2010 | Liu et al. | |
| 2010/0287701 | A1 | 11/2010 | Frias | |

* cited by examiner

MULTI-ZONE TEMPERATURE MODULATION SYSTEM FOR BED OR BLANKET

CROSS-REFERENCE TO RELATED APPLICATIONS

This application is a continuation of U.S. patent application Ser. No. 18/170,990, filed Feb. 17, 2023, which is a continuation of U.S. patent application Ser. No. 17/736,657, filed May 4, 2022, which is a continuation of U.S. patent application Ser. No. 17/500,498, filed Oct. 13, 2021 and issued as U.S. Pat. No. 11,324,330, which is a continuation of U.S. patent application Ser. No. 16/684,648, filed Nov. 15, 2019 and issued as U.S. Pat. No. 11,147,389, which is a continuation of U.S. patent application Ser. No. 15/961,134, filed Apr. 24, 2018 and issued as U.S. Pat. No. 10,477,978, which is a continuation of U.S. patent application Ser. No. 15/482,148, filed Apr. 7, 2017 and issued as U.S. Pat. No. 10,667,622, which is a continuation of U.S. patent application Ser. No. 12/203,241, filed Sep. 3, 2008, which claims the benefit of U.S. Provisional Patent Application No. 61/084,995, filed Jul. 30, 2008, each of which is incorporated herein by reference in its entirety.

FIELD OF THE INVENTION

The present invention relates generally to heating and cooling systems for bed mattresses, blankets, and other furniture, and more generally to a multi-zone temperature modulation system whereby each zone is able to be selectively and independently heated or cooled to a target temperature.

BACKGROUND OF THE INVENTION

It is desirable to control the temperature of a bed or other piece of furniture that supports a person, such as when sleeping. Such control has therapeutic value in treating symptoms of menopause or conditions of hypothermia or hyperthermia, particularly when those conditions manifest themselves over a long period of time. Therapeutic value is also seen for individuals who have circulatory disorders, sleep disorders, and other conditions that are improved by increasing the comfort felt during sleep. Such control is desirable even outside the therapeutic value of cooling or heating a mattress, simply to match the personal comfort preferences of healthy individuals, or to provide localized control when a more general control, such as heating or air conditioning of a sleeping space, is unavailable or when adjustments to the general control cause others discomfort or are inefficient from an energy consumption perspective.

Various methods of temperature control are known, including such classic systems as electric blankets or heating pads, as well as more recent developments that involve the circulation of a heated or cooled fluid through a mattress, such as directing air through the chambers of an air mattress or directing air or a fluid through a tube that is embedded within a mattress or a mattress topper. The more advanced of these systems utilize a heat source or sink (i.e., cooling source) to heat or cool a reservoir of fluid to a selected target temperature and pump the heated or cooled fluid through the available conduit, relying on principles of heat exchange to control the mattress temperature.

In connection with the known methods of accomplishing temperature control, there are various problems and deficiencies that render these known methods ineffective or less than fully effective at achieving temperature control under optimal conditions. For example, such systems, particularly those that are designed for cooling, are often fairly noisy, thereby interfering with the subject individual's ability to sleep and defeating many of the therapeutic aspects of such systems.

Of somewhat more universal importance, however, is the lack of specificity such systems have in controlling temperatures in various zones of coverage, when the user desires different temperatures in different zones. A user that desires a particular temperature for sleeping often shares his or her bed with another person who desires a different temperature for sleeping-a situation that sometimes leads to arguments, one user's lack of comfort, or a compromise that leaves neither partner happy. Another user desires, for example, a certain temperature for the majority of his or her body but a somewhat warmer temperature for his or her feet, or a somewhat cooler temperature for his or her head.

In order to satisfy the need for multiple zones, conventional systems have heretofore utilized multiple apparatuses to conduct zone-independent temperature modulations. In the situation where the bed is to be shared, each side of the bed is provided with its own independent temperature control apparatus. A similar arrangement is able to be used for different zones associated with a single user. However, conventional arrangements that require multiple independent systems require substantial duplication of the most expensive and potentially noisy parts of a conventional temperature control system—the circulation pump and the heating or cooling source.

Yet another issue with conventional single-zone systems is that they are not programmatically controllable over time. Although some systems provide for thermostatic control to prevent overheating or overcooling, some users desire, for example, a warmer temperature at bedtime and a cooler temperature later in the sleep cycle, or vice versa. These systems are even more deficient when the user wishes to coordinate varying temperatures in various zones with various stages of the sleep cycle in order to promote deeper and more satisfying sleep.

Although many of the applications of the present invention relate to sleep and beds, the invention is equally applicable to other types of support furniture, such as chairs, or to more portable systems, such as wheelchair cushions, blankets, or mattress toppers.

What is needed is a multi-zone temperature modulation system that enables selective and independent heating or cooling of specific zones using a single heating or cooling apparatus and pump to minimize the cost efficiency of manufacture, and that is programmatically controlled to vary the target temperature over time according to personal comfort or sleep cycle considerations.

SUMMARY OF THE INVENTION

In accordance with the aforementioned needs, the present invention includes a temperature modulation system for a bed that uses a fluid, such as a liquid or a gas, as the medium for temperature change at a surface of the bed. The fluid is directed through at least two conduit circuits that traverse respective independent zones, utilizing principles of heat exchange to heat or cool the bed surface. The invention employs a thermoelectric device to modulate the temperature of the fluid and a pump, such as a multichannel pump or a pump in combination with a multi-way valve, to pump the fluid through the conduit circuits. In this arrangement, each of the conduit circuits selectively and independently directs fluid through its respective zone to achieve a temperature of the mattress within the zone that is independent of the temperature of the mattress outside that zone.

In another feature of the present invention, a valve, which is mechanically or electrically operated, is able to be used selectively to direct fluid through the various conduit circuits at different rates to produce different levels of temperature change in different zones. Such an arrangement is flow-based, in which a given flow of fluid is divided among zones, or a time-division arrangement, in which the full flow of fluid is directed sequentially through the zones as needed to produce the target temperature of each.

In yet another feature of the invention, multiple components, such as pumps and valves, are utilized to achieve the appropriate temperature in each of multiple zones.

The system of the present invention is able to produce heating alone, cooling alone, or both heating and cooling, as the user requires.

In still another feature of the invention, the system is provided with one or more temperature sensors, which are configured to measure the temperature of the zone to provide feedback to a control mechanism in order to enable the system to reach the target temperature in each zone more efficiently.

The system of the present invention is able to be embedded within the mattress, or is portable, being embedded in a topper or blanket that is designed to be placed over the mattress.

The system is able to be conveniently controlled by remote control, and when the system is integrated with the mattress, the remote control is likewise integrated with other remotely controlled functions of the mattress, such as firmness control (for an air-based mattress), vibration control, and the like.

In another feature of the invention, the system is provided with a port connected to the constituent components (or to an internal control mechanism for those components) that enables the system to be connected to a computer for programmatic control of the operation of the system.

Alternatively, the present invention includes a multi-zone temperature modulation system for providing selective temperature change to a living subject. The system includes first and second independent zones, each of which has a conduit circuit for directing fluid through the zone in order to bring that zone's temperature to a target temperature. As above, a thermoelectric device selectively modulates the temperature of the fluids, at least one pump is used to pump the fluids through the conduit circuits. The fluid associated with one zone is isolated from fluid associated with the other zone, or those fluids are pooled. The system employs separate pumps for separate conduits, or it employs a single pump, aided by a multi-outlet valve or other valve types that permit separate flow to different circuits.

The present invention also alternatively includes a temperature modulation system for providing selective temperature change to a living subject on a time-based programmatic basis. As above, the system includes a fluid for moderating temperature change within a selected zone adjacent the subject, and a conduit circuit for directing the fluid through the selected zone according to a selected target temperature. A thermoelectric device handles the heating or cooling, and a pump is used to pump the fluid through the conduit circuit.

This alternative system also utilizes control means, such as a general-purpose or special-purpose computer that has been programmed, to control operation. The control means are programmed to control the zone temperature according to a schedule of target temperatures over a selected period of time.

Similar features to those described in connection with the embodiment described first above are able to be utilized in the alternative systems.

BRIEF DESCRIPTION OF THE DRAWINGS

Further features, embodiments, and advantages of the present invention will become apparent from the following detailed description with reference to the drawings, wherein.

DETAILED DESCRIPTION OF THE PREFERRED EMBODIMENTS

Figure 1:
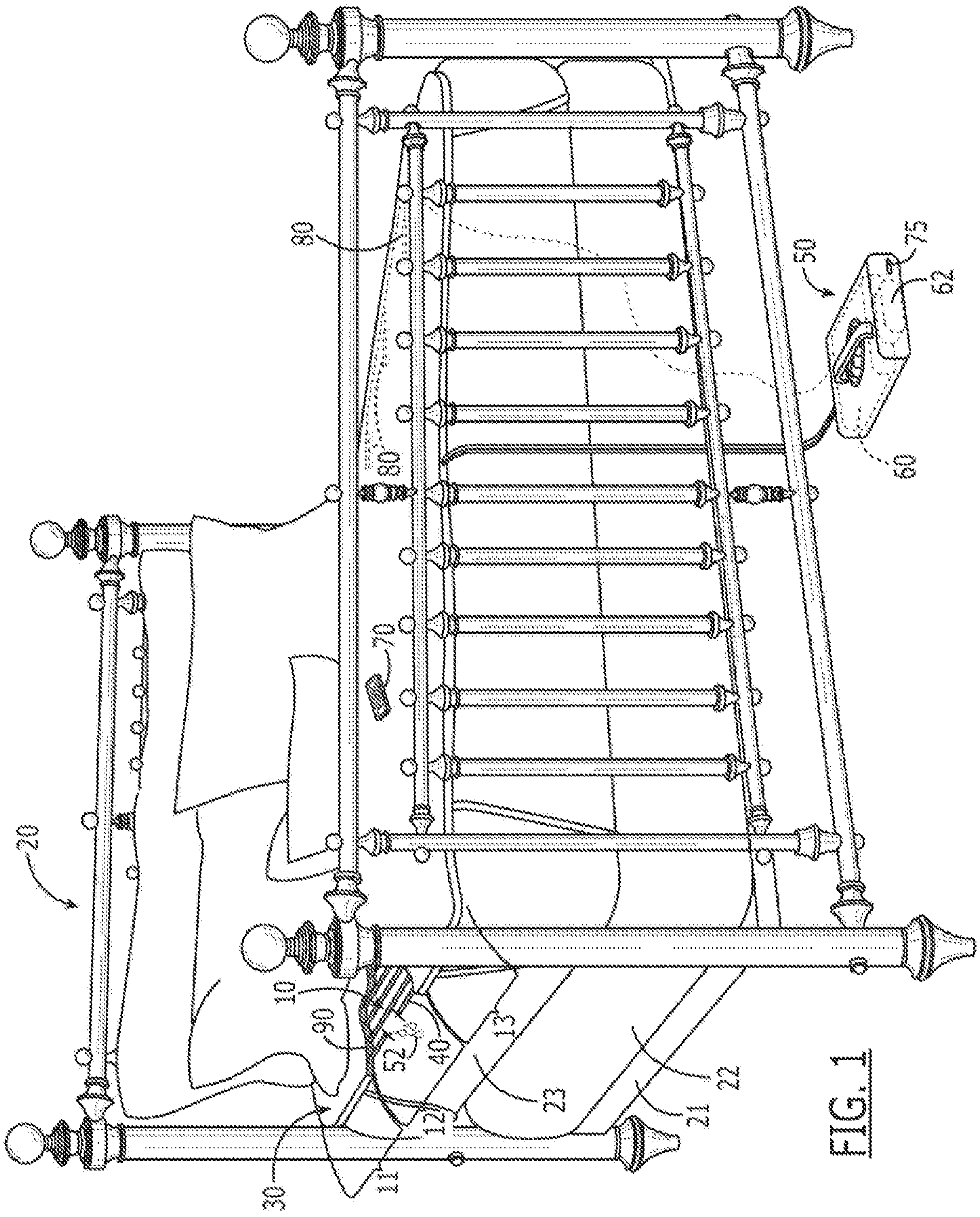
FIG. 1 is an environmental view of a preferred embodiment of the present invention.

Referring now to the drawings, FIG. 1 illustrates the general arrangement of a preferred embodiment of a multi-zone temperature modulation system 10 according to the present invention in an environmental perspective view. A bed 20 includes a support frame 21, a box spring foundation 22, and a mattress 23, all of conventional construction. In the depicted embodiment, the mattress 23 has been provided with a topper 30 that has embedded within it a multi-zone temperature modulation system 10 according to the present invention. Although the depicted embodiment illustrates a separate mattress topper 30, those skilled in the art will recognize that it is equally possible to combine the mattress 23 and topper 30 into a single piece, with the temperature modulation system 10 effectively being embedded in the mattress 23 itself. A separate mattress topper 30 holds some advantages over the combined construction because of the ability to use a separate topper 30 to retrofit an existing mattress 23.

The system 10 as depicted is divided generally into three temperature zones 11,12,13, which correspond generally to the position of a person's head and neck, trunk and legs, and feet when the person (not shown) lies on the mattress 23. The depicted system 10 is arranged to permit the three zones 11,12,13 to be targeted for three independent temperatures. As used herein, the term "independent temperature" refers to a zone temperature that is set or targeted without respect to the temperature of another zone; an independent temperature is able to be the same temperature as that of another zone, and there is no requirement that the temperatures be different.

Although the embodiment depicted in FIG. 1 shows multiple zones arranged for a single person's use, other multi-zone arrangements are possible, and will be discussed in greater detail below. The present invention is not limited to a particular number or arrangement of the zones; it is sufficient for the multi-zone aspect of this invention that there be more than one zone, regardless of the disposition of the zones.

In order to accomplish the temperature modulation of the zones 11,12,13, a set of conduit circuits 40, at least one per zone, is provided. These conduit circuits 40 are able to be formed of any suitable material, such as plastic or metal, or more preferably flexible silicone, selected with the principal consideration being the ability of the conduit circuit material to transmit heat to or from the topper 30. Depending on the configuration of the zone, it is sometimes preferred to have more than one conduit circuit 40 per zone, particularly in the case of a very large zone. The conduit circuit or circuits 40 repeatedly traverse the zone in a back-and-forth arrangement, in order to provide temperature modulation to the entire desired surface area of the zone. The conduit circuits 40 are arranged to return to their starting point to enable the return of fluid to the heating/cooling apparatus 50.

The heating/cooling apparatus 50 generally includes one or more reservoirs 60 for temperature modulation fluid 52, which is a liquid, such as water, or a gas. In a preferred embodiment shown, water is the fluid mediator for temperature modulation. The reservoir 60 is provided with a device 62 for heating or cooling the liquid 52 stored therein, such as a Peltier thermoelectric device. Such a device is generally well known and useful for its efficient movement of heat when a direct current is applied thereacross. The Peltier device 62 creates a heat source and a heat sink on its opposite sides, and if the direction of the current applied across it is reversed, the heat source and heat sink switch sides. This feature makes a Peltier device 62 ideal for systems which require selective heating and cooling.

The Peltier device 62 is thus used to change the temperature of the reservoir fluid 52, i.e., heating or cooling the fluid 52 in order to heat or cool the zones 11,12,13, according to the position of a switch that is under one of various forms of control to be discussed in more detail below. In response to a need for heating or cooling a zone, fluid is drawn from the reservoir 60 and directed through the conduit circuits 40 to effectuate the necessary temperature change. The application of energy necessary to move the fluid 52 through the conduit circuits 40 is effectuated in a variety of possible ways, such as through the use of a multichannel pump, multiple single-outlet pumps, or a single-outlet pump in combination with one or more valves.

Control 70, which is wireless as shown but which is alternatively provided with a wired connection to the heating/cooling apparatus 50, is used to set the target temperatures for each of the zones. Control 70 in combination with temperature probes 80 will enable the system to maintain a target temperature in each zone 11,12,13 through the selective application of heated or cooled fluid to the conduit circuits 40 in each zone. Using the control 70, a user will select an independent target temperature for each zone 11,12,13. Temperature probes 80 in each zone will provide temperature data for that zone to the heating/cooling apparatus 50, which will by comparison of the target temperature set using the control 70 and the actual measured temperature determine whether to heat or cool the fluid 52 and determine to which conduit circuit or circuits 40 the heated or cooled fluid 52 should be distributed in order to make the actual temperature match the target temperature.

In a preferred embodiment, the topper 30 or mattress 23 (for embedded designs) will include padding 90 between the conduit circuits 40 and the resting surface, in order to improve the comfort of a user who lies upon the system and to prevent the concentrated heat or cold of the conduit circuits 40 from being applied directly or semi-directly to the user's body. Instead, the conduit circuits 40 will heat or cool the padding 90, which will provide more gentle temperature modulation for the user's body.

Figure 2A:
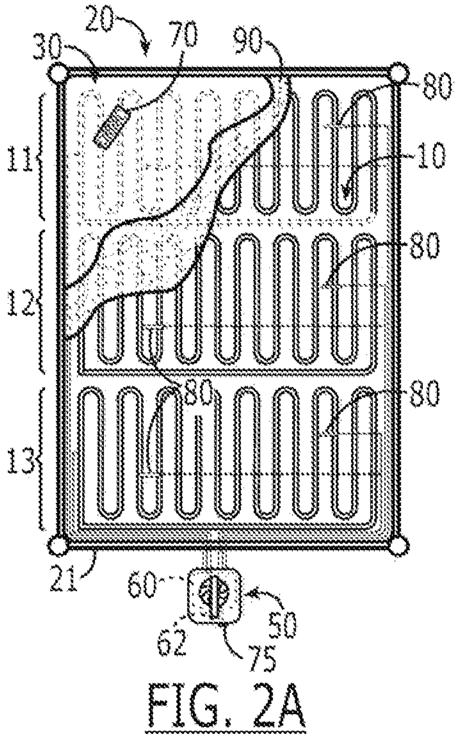
FIG. 2A is a plan view of a preferred embodiment as in FIG. 1.
Figure 2B:
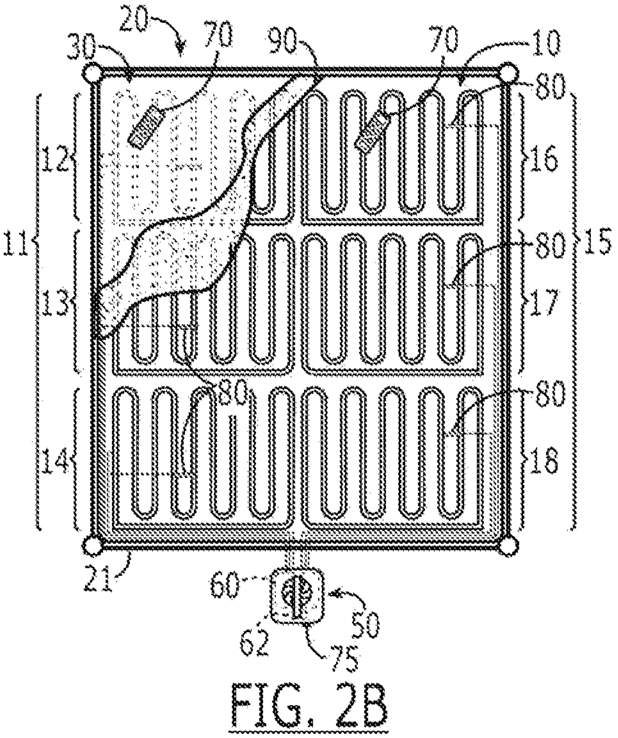
FIG. 2B is a plan view of an alternative embodiment.
Figure 2C:
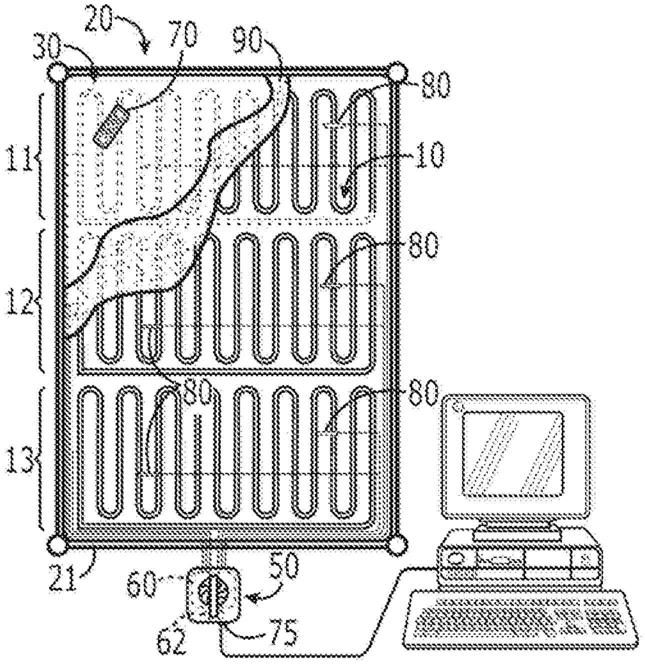
FIG. 2C is a plan view of another alternative embodiment.

Referring now to FIGS. 2A-2C, various embodiments of the present invention are illustrated in plan view for comparative purposes, in order to demonstrate the various zone arrangements that are serviced according to the present invention. In FIG. 2A, the view is as in FIG. 1, in which three zones 11,12,13, corresponding generally to the head, body and legs, and feet, respectively, of the subject utilizing the system. Although only three zones are shown, it is equally possible to have two, four, or more zones of control. In FIG. 2B, another preferred embodiment is shown in which two sides of a two-person bed, such as a full, queen, or king size bed, are provided with two separate zones 11,15. In one embodiment, these zones are divided into zones or subzones 12,13,14 and 16,17,18 as in FIG. 2A. In the arrangement shown in FIG. 2B, two separate controls are provided in order to enable each user to set his or her own preferences. In this embodiment, despite the presence of two separate controls, a single heating/cooling apparatus 50 are utilized to control the temperature of reservoir fluid 52.

In FIG. 2C, another alternative embodiment is shown in which, again, there are three zones 11,12,13. For purposes of this embodiment, the arrangement could as easily encompass only a single zone 11, because the significance of this embodiment is in the control system 71. Instead of a wireless handheld control, the heating/cooling apparatus 50 is conveniently connected via a port 75 such as a USB, serial, or other port to computer 71.

Computer 71 has been programmed to control the operation of the system 10 in accordance with a schedule of target temperatures selected to correlate with sleep cycles of the user. Such an arrangement promotes deeper, more restful sleep by altering body temperature at critical points. This arrangement will be discussed in greater detail below.

Figure 3:
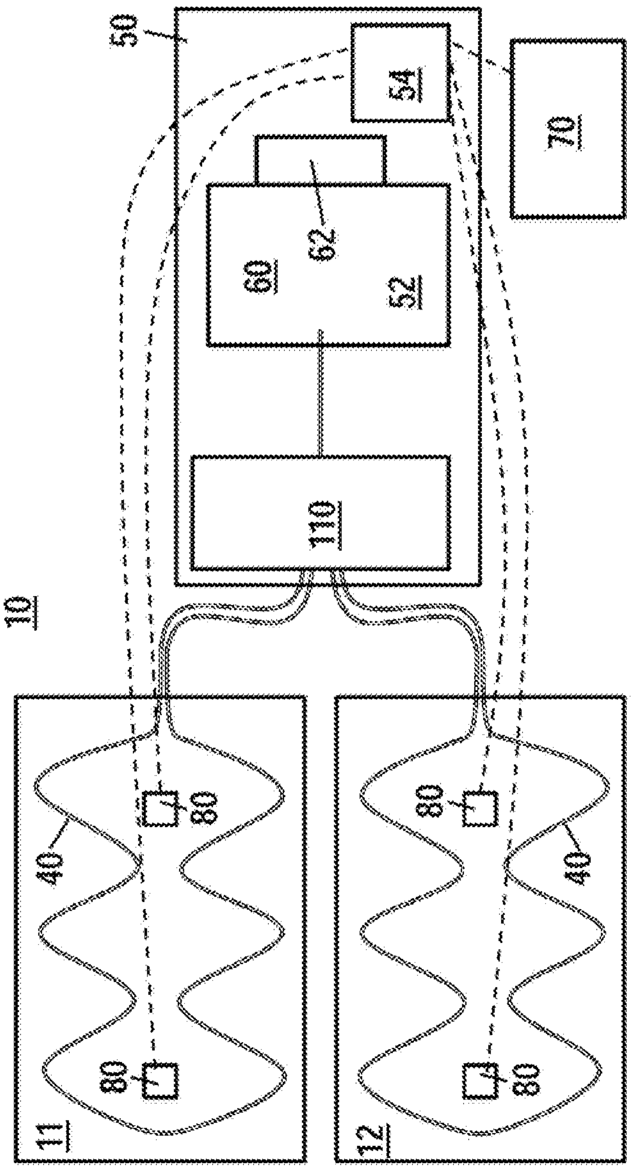
FIG. 3 is a schematic view of a preferred embodiment of the present invention.

Referring now to FIG. 3, a preferred embodiment of the present invention is shown in a schematic view to illustrate in greater and more convenient detail the various components of the system. Zones 11,12 are provided with conduit circuits 40 for directing a heated or cooled fluid 52 therethrough. The fluid 52 is held in a reservoir 60 and heated or cooled using a Peltier device 62 or any other suitable means. Temperature probes 80 are located within the zones 11,12 and are connected to the control unit 50, which contains computing apparatus 54, (e.g., a microprocessor, a circuit board containing logic circuits, or any other suitable arrangement), the construction of which is well known in the art to which the present invention relates. Computing apparatus 54 is attached to a user interface 70, which is, in various embodiments be a handheld wireless or wired remote control, a personal computer, or other suitable input device. The user interface 70 is used to set the parameters of operation of the control unit 50.

The computing apparatus 54 is designed or programmed to operate the Peltier device 62 and more particularly to apply direct current of a given polarity across the Peltier device 62, in order to heat or cool the fluid 52 in the reservoir 60, as needed. The computing apparatus 54 is also designed or programmed to operate a pump and valve system 110, various embodiments of which are illustrated in schematic detail in FIGS. 4A-4C. By manipulating the pump and valve system 110, the computing apparatus controls the manner in which heated or cooled fluid 52 is driven through the conduit circuits 40 to heat or cool the zones 11,12.

For example, in the beginning of use, a user, using the user interface 70, calls for a target temperature of 60° F. in zone 11 and a target temperature of 70° F. in zone 12. The temperature probes 80 register the temperature of zone 11 as 75° F. in zone 11 and 74° F. in zone 12. The computing apparatus 54 therefore activates the Peltier device 62 in cooling mode, to chill the reservoir fluid below 60° F. The computing apparatus 54 also activates the pump and valve system 110, causing fluid 52 to flow through both conduit circuits 40, back and forth across the two zones 11,12, and returning to the reservoir 60. Over time, the actual temperature as measured by the temperature probes 80 decreases. At a given point, the temperature in zone 12 is measured at the target of 70° F. The computing apparatus 54 then controls the pump and valve system 110 to cause cooled fluid to stop flowing through zone 12, even as cooled fluid continues to flow through zone 11. Eventually, the temperature in zone 11 will also reach the target. However, because the temperature in zone 12 rises, the pump and valve system are adjusted one or more times during the process to maintain the temperature in zone 12 at the target, while the temperature in zone 11 continues to drop to the lower target temperature.

Those skilled in the art will recognize that programmatic control of the target temperatures over time, such as over the course of a night's sleep, will be possible if a computer 70 is employed as the user interface. Because the target temperatures is able to be set at any time, those target temperatures are able to be manipulated through the sleeping period in order to match user preferences or a program to correlate with user sleep cycles to produce a deeper, more restful sleep.

In the system heretofore described, the details of the pump and valve system 110 have been largely omitted. A system 110 according to the present invention will permit the elimination of duplicate parts, typically the most expensive parts of such an apparatus, such as the heating/cooling device 62 and the control apparatus 54, through the creative use of one or more pumps and valves and principles of time and flow division.

Figure 4A:
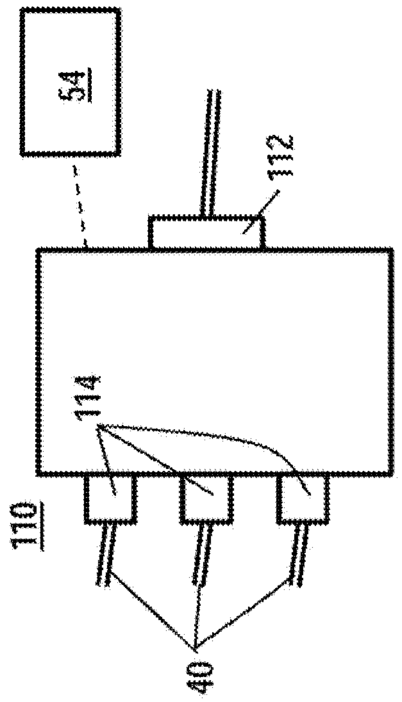
FIG. 4A illustrates a first preferred embodiment of a pump and valve system.

Referring now to FIG. 4A, a first preferred embodiment of a pump and valve system 110 is a multichannel pump 110 which includes an inlet 112 which serves as a conduit for fluid from the reservoir 60 and a number of outlets 114, each of which is independently controlled to permit fluid 52 to flow or not to flow into a respective conduit circuit 40 associated with a zone 11,12,13. In this arrangement, the multichannel pump 110 applies pressure to the fluid 52 and selectively opens each outlet 114 according to instructions from a control apparatus 54 (see FIG. 3) to allow fluid to flow to the associated zone 11,12,13, thus cooling or heating the zone 11,12,13 in accordance with a differential between the target temperature and the actual temperature for that zone. Because the outlets 114 are individually controlled, the flow of fluid 52 is divided among one or more outlets 114 at the same time. Alternatively, this arrangement is used in a time-division arrangement, whereby the full flow of fluid 52 is directed serially through the respective outlets 114 in order to achieve the same effect.

Figure 4B:
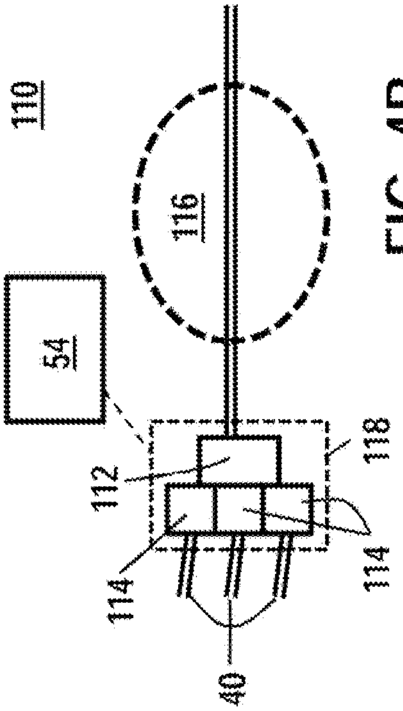
FIG. 4B illustrates a second preferred embodiment of a pump and valve system.

Referring now to FIG. 4B, a second preferred embodiment of a pump and valve system 110 is illustrated. This arrangement is simpler in scope than the embodiment shown in FIG. 4A, in that the pump 116 is physically separated from the valve 118. The pump 116 is activated to provide fluid pressure, and the valve 118 is under the control of the control apparatus 54, alternately directing the fluid from inlet 112 through outlets 114,114,114 serially in a time-division arrangement.

Figure 4C:
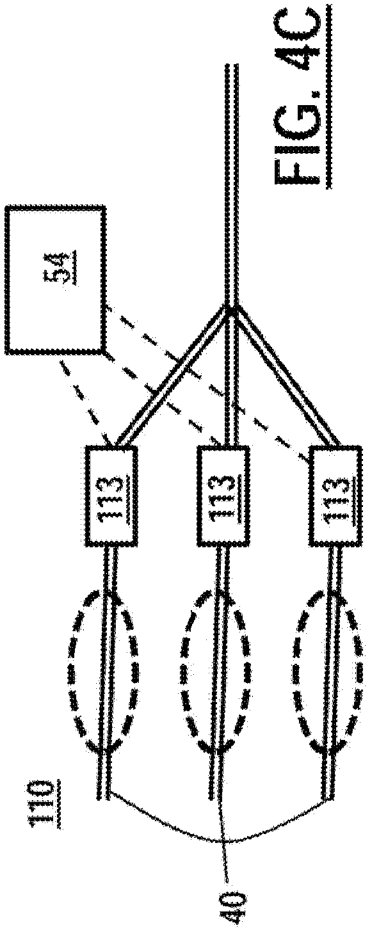
FIG. 4C illustrates a third preferred embodiment of a pump and valve system.

Referring now to FIG. 4C, another preferred embodiment of a pump and valve system 110 is illustrated. In this arrangement, each zone 11,12,13 is provided with its own pump 110 and valve 113, which independently operates to provide fluid pressure through the associated conduit circuit 40. This arrangement results in some duplication of components, but is useful under certain circumstances in which there is a need to provide full flow of fluid 52 through each zone 11,12,13 at all times.

The principle of time division, as applied in the present invention, relies upon the tendency of the temperature of a given zone to remain fairly steady over time. That is, heating or cooling often need only be applied for a few minutes per hour to keep the temperature of a given zone at the target, while another zone requires fairly constant heating or cooling to maintain its target temperature. The control apparatus 54 thus divides the time among the zones in an efficient manner that keeps each zone as near to its target temperature as possible over the greatest period of time.

Figure 5A:
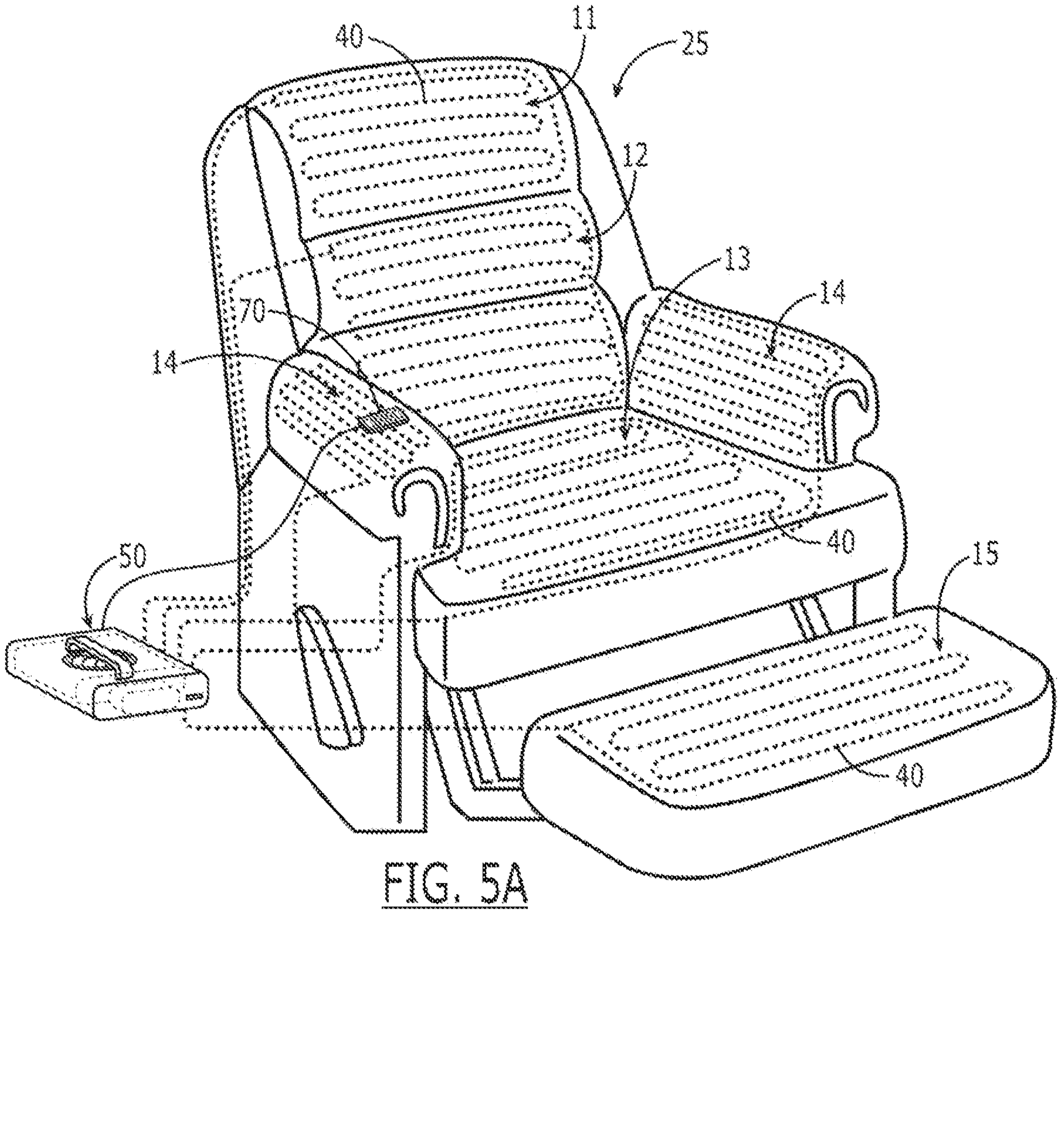
FIG. 5A illustrates a recliner chair with multiple independent temperature zones.

Although the arrangement illustrated in FIGS. 1 and 2A-2C is in a mattress-type arrangement, such as a mattress 23 or a topper 30, it is equally possible to apply the concepts of the invention to other contexts. For example, as in FIG. 5A, a recliner chair 25 is shown. In much the same manner as is done with the mattress 23 or topper 30 arrangements, the recliner chair 25 is provided with a number of zones 11,12,13,14, 15, each of which has an associated conduit circuit 40 under independent temperature control by a control apparatus 50 as directed by a user interface 70. The operation of such a system is identical to that described above.

Figure 5B:
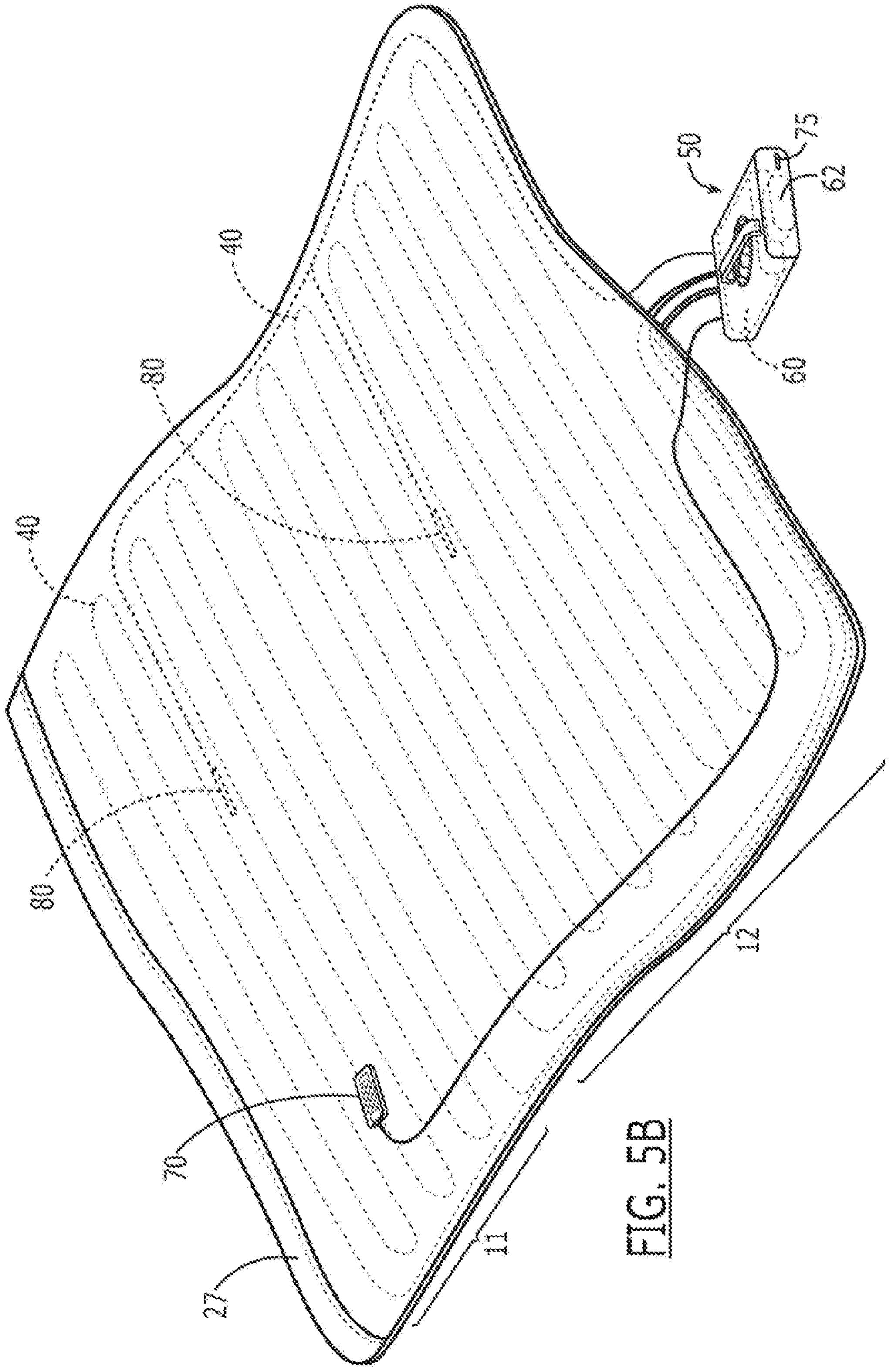
FIG. 5B illustrates a multi-zone heating/cooling system contained within a blanket.

Also, as is illustrated in FIG. 5B, the concepts of the present invention are not limited to support furniture such as mattresses, chairs, and the like. A multi-zone heating/cooling system is contained within a blanket 27, for example, which is conveniently placed over or under the user to provide heating or cooling within given zones 11,12. In such an arrangement, the use of flexible tubing for the conduit circuits 40 is important to promote the ability of the blanket 27 to conform to the user's body.

Referring now to the drawings generally, a temperature modulation system 10 for a bed 20 includes a fluid 52 for moderating temperature change at a surface 24 of the bed 20, a number of conduit circuits 40 for directing the fluid 52 through respective zones 11,12,13, and a thermoelectric device 62 for modulating the temperature of the fluid 52. The system 10 also includes a pump 110 for pumping the fluid 52 through the conduit circuits 40. Each of the conduit circuits 40 selectively, by use of a pump and valve system 110, and independently directs fluid 52 through its respective zone 11,12,13 to achieve a temperature of the mattress 23 of the bed 20 that is independent of the temperature of the bed 20 outside the zone 11,12,13.

In one embodiment, the fluid 52 is a liquid such as water, or it is a gas, such as air, depending upon the requirements of the system. In one embodiment, the pump and valve system 110 is a multichannel pump, or it is a single pump with a multi-outlet valve, or it includes several pumps and valves. The particular type of pump and valve system chosen is tied to the nature of the fluid 52. The valves 113 are mechanically or electrically operated, under the control of a control system 54 that selectively opens and closes the valves 113 to permit fluid 52 to flow therethrough.

The system 10 is designed to operate on a flow-division or a time-division basis, the latter being characterized by permitting the full flow of fluid 52 to be directed through a single conduit circuit 40 for a given period of time, one at a time serially, to achieve the target temperature in each zone 11,12,13.

In order that the system 10 is able to control each zone individually, temperature sensing probes 80 are provided, which give feedback to the control system 54 concerning the actual temperature of the given zone 11,12,13.

Through the use of a Peltier thermoelectric device 62, it is possible to provide heating and cooling using the same unit, thereby increasing the utility of the present invention in comparison to systems that provide only heating or only cooling.

In the context of bed use, the system 10 is able to be integrated into the mattress 23, or it is able to be a separate article such as a mattress topper 30.

The system 10 conveniently receives user input through a user interface 70 such as a remote control, wired or wireless. Alternatively, the system is provided with a port 75 to connect it to a computer 71 such as a personal computer, in order to enable programmatic control of the system over time.

More generally, the present invention includes a multi-zone temperature modulation system 10 for providing selective temperature change to a living subject. The system includes a first zone 11 that includes a first conduit circuit 40 for directing a first fluid 52 therethrough, in order to bring the first zone temperature to a target temperature for the first zone. The system also includes a second zone 12 of similar but independent construction, and the second zone 12 has a target temperature that is independent of the target temperature of the first zone 11. As above, this embodiment uses a thermoelectric device for selectively modulating the temperature of the first and second fluids, as well as at least one pump for pumping the fluids through the conduit circuits. Similar features of this embodiment are provided as above.

This arrangement is applicable to a wide variety of contexts, including beds, mattress toppers, chairs, other support furniture, and blankets.

Yet another embodiment involves the use of at least one zone and the selective manipulation of the temperature over a period of time. In such an embodiment, a temperature modulation system 10 provides selective temperature change to a living subject and includes a fluid 52 for moderating temperature change within a selected zone 11 adjacent the subject. At least one conduit circuit directs the fluid 52 through the zone 11 to control temperature of the zone 11 according to a selected target temperature. The structure is largely as above, but the control system 54 (either on its own or under the programmatic control of an attached computer 71) is programmed to control the zone temperature according to a schedule of target temperatures over a selected period of time.

In view of the aforesaid written description of the present invention, it will be readily understood by those persons skilled in the art that the present invention is susceptible of broad utility and application. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by any claims appended hereto and the equivalents thereof.

What is claimed is:

1. A system for adjusting a temperature of a furnishing comprising:

a control unit connectable to the furnishing that includes a plurality of independently-controllable temperature zones, each temperature zone comprising at least one conduit circuit, the control unit comprising:

a microprocessor-based controller;

a valve system operatively coupled to the controller and to the at least one conduit circuit of each of the plurality of temperature zones;

at least one pump operatively coupled to the controller, the at least one pump including at least one inlet and at least one outlet operatively coupled to the valve system;

a reservoir operative to hold a fluid; and at least one thermoelectric device operatively coupled to the controller to adjust the temperature of the fluid in the reservoir under control of the controller;

wherein the at least one pump is operative, under control of the controller, to pump the fluid through the at least one outlet and into at least one selected temperature zone of the plurality of temperature zones through the valve system; and wherein the controller is operative to control the at least one thermoelectric device, the at least one pump, and the valve system to achieve different target temperatures among the plurality of temperature zones.

2. The system of claim 1, wherein the fluid is water.

3. The system of claim 1, wherein the at least one conduit circuit comprises one or more silicone conduits.

4. The system of claim 1, wherein the at least one thermoelectric device is a Peltier device.

5. A system for adjusting a temperature of a fluid comprising:

a mattress topper comprising a plurality of independently-controllable temperature zones, each temperature zone comprising at least one conduit circuit; and a control unit comprising:

a microprocessor-based controller;

a valve system operatively coupled to the controller and to the at least one conduit circuit of each of the plurality of temperature zones;

at least one pump operatively coupled to the controller, the at least one pump including at least one inlet and at least one outlet operatively coupled to the valve system;

a reservoir operative to hold the fluid;

at least one thermoelectric device operatively coupled to the controller to adjust the temperature of the fluid in the reservoir under control of the controller;

wherein the at least one pump is operative, under control of the controller, to pump the fluid through the at least one outlet and into at least one selected temperature zone of the plurality of temperature zones through the valve system; and wherein the controller is operative to control the at least one thermoelectric device, the at least one pump, and the valve system to achieve different target temperatures among the plurality of temperature zones;

wherein the mattress topper is configured to removably secure to a mattress, and wherein the mattress topper includes a top surface padding.

6. The system of claim 5, wherein the fluid is water.

7. The system of claim 5, wherein the at least one thermoelectric device is a Peltier device.

8. The system of claim 5, wherein the at least one conduit circuit comprises a silicone conduit.

9. A system for adjusting a temperature of a furnishing comprising:

temperature-adjusting means for fluidly connecting to a furnishing that includes a plurality of independently-controllable temperature zones, each temperature zone comprising at least one conduit circuit, the temperature-adjusting means comprising:

controlling means;

fluid switching means operatively coupled to the controlling means and to the at least one conduit circuit of each of the plurality of temperature zones;

pumping means operatively coupled to the controlling means, pumping means coupled to the fluid switching means;

fluid holding means; and temperature adjusting means operatively coupled to the controlling means to adjust the temperature of fluid in the fluid holding means under control of the controlling means;

wherein the at least one pumping means is operative, under control of the controller, to pump the fluid through at least one selected temperature zone of the plurality of temperature zones through the fluid switching means; and wherein the controlling means is operative to control the at least one temperature adjusting means, the pumping means, and the fluid switching means to achieve different target temperatures among the plurality of temperature zones.

* * * * *